(12) United States Patent
Kuhn et al.

(10) Patent No.: US 6,422,627 B1
(45) Date of Patent: *Jul. 23, 2002

(54) TRUCK BED EXTENSION APPARATUS

(76) Inventors: James J. Kuhn, 405 Locust Rd., Wayne, PA (US) 19087; Steven Pancheri, 636 Overlook Dr., Donningtown, PA (US) 19335

( * ) Notice: Subject to any disclaimer, the term of this patent is extended or adjusted under 35 U.S.C. 154(b) by 0 days.

This patent is subject to a terminal disclaimer.

(21) Appl. No.: 09/653,565

(22) Filed: Aug. 31, 2000

Related U.S. Application Data

(63) Continuation-in-part of application No. 09/258,786, filed on Mar. 1, 1999, now Pat. No. 6,142,548.

(51) Int. Cl.[7] .............................. B62D 33/08; B62C 1/06
(52) U.S. Cl. ................... 296/26.1; 296/37.6; 296/57.1
(58) Field of Search .......................... 296/26.11, 26.1, 296/26.08, 26.09, 26.01, 37.5, 37.6, 57.1

(56) References Cited

U.S. PATENT DOCUMENTS

| | | | | | |
|---|---|---|---|---|---|
| 4,472,639 | A | * | 9/1984 | Bianchi | 296/26.11 |
| 4,531,773 | A | * | 7/1985 | Smith | 296/26.11 |
| 4,743,058 | A | * | 5/1988 | Fedrigo | 296/57.1 |
| 4,763,945 | A | * | 8/1988 | Murray | 296/57.1 |
| 5,188,415 | A | * | 2/1993 | Wagner | 296/57.1 |
| 5,468,038 | A | * | 11/1995 | Sauri | 296/57.1 |
| 5,478,130 | A | * | 12/1995 | Matulin et al. | 296/57.1 |
| 5,788,311 | A | * | 8/1998 | Tibbals | 296/62 |
| 5,857,724 | A | * | 1/1999 | Jaraman | 296/26.11 |
| 6,149,219 | A | * | 11/2000 | Schambre et al. | 296/57.1 |
| 6,340,190 | B1 | * | 1/2002 | Rosebrugh et al. | 296/26.11 |

* cited by examiner

*Primary Examiner*—Stephen T. Gordon
*Assistant Examiner*—Patricia L. Engle

(57) ABSTRACT

The present invention comprises an extension apparatus for a vehicle storage area with the preferred embodiments using a bracket and frame construction to provide for a foldable lightweight extension device.

12 Claims, 10 Drawing Sheets

TRUCK BED EXTENSION APPARATUS

This application is a continuation in part of Ser. No. 09/258,786, filed Mar. 1, 1999, now U.S. Patent No. 6,142,548.

The present invention relates to vehicle modifications. More particularly, the present invention relates to extensions for the storage areas of vehicles.

BACKGROUND OF THE INVENTION

Vehicle storage areas, such as pickup truck beds and sport utility or station wagon cargo areas, provide convenient transportation for all sizes and types of materials. Yet even these may lack desired versatility. For example, a pickup bed with a closed tailgate permits the retention of materials in the bed. Occasionally there is a need to carry materials larger than the closed tailgate configuration permits. The tailgate can be opened enlarging the bed size. This, however, eliminates the ability to retain the materials through use of the tailgate, and so netting or ropes may be used.

In many instances this is a less than desirable solution. Various devices exist that assist in extending vehicle storage areas, such as the one shown in U.S. Pat. No. 4,472,639, which discloses the use of panels attached to the tailgate to make an extension unit. The somewhat complicated device has panels that are heavy and unwieldy and their means of attachment to the tailgate is less than desirable. The piano hinge used in the disclosed invention for example, does not allow for movement of the unit laterally on the tailgate. This means the unit is relatively immobile.

Accordingly, it is an object of the present invention to provide an extension apparatus for vehicular storage areas.

It is a further object of the present invention to provide an inexpensive and simple extension apparatus for vehicular storage areas.

SUMMARY OF THE INVENTION

The present invention provides an apparatus for extending storage areas of vehicles. The preferred embodiment of the present invention installs on a pickup truck tailgate and is folded and unfolded as desired. An unfolded configuration of this embodiment allows for the extension of the box-like bed configuration of the pickup bed, using the tailgate as essentially part of the floor.

DETAILED DESCRIPTION OF THE PREFERRED EMBODIMENTS

Figure 1:
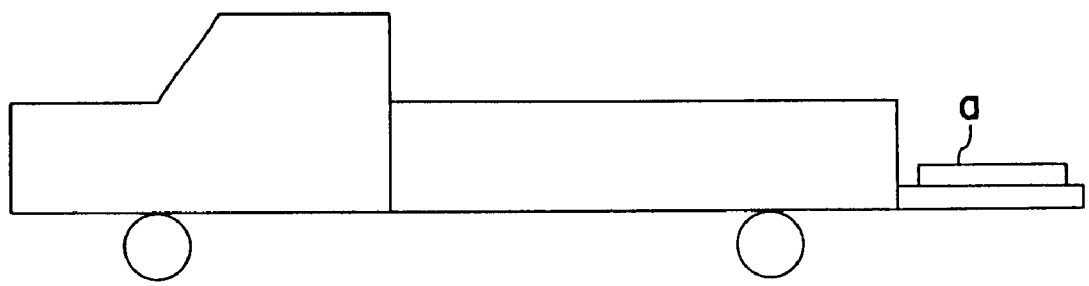
FIG. 1 shows a preferred embodiment of the present invention.

FIG. 1 shows a preferred embodiment, seen generally at a, of the present invention. The embodiment is shown folded and mounted on a pickup truck tailgate.

Figure 2:
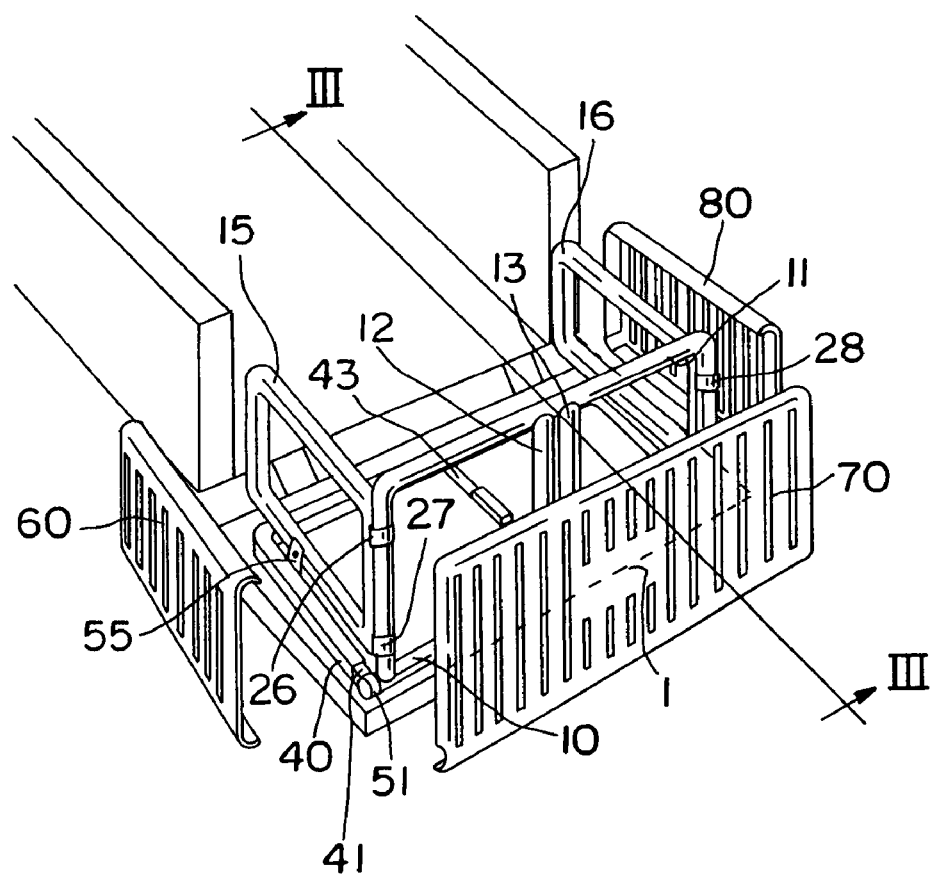
FIG. 2 shows another view of the embodiment of FIG. 1.
Figure 5:
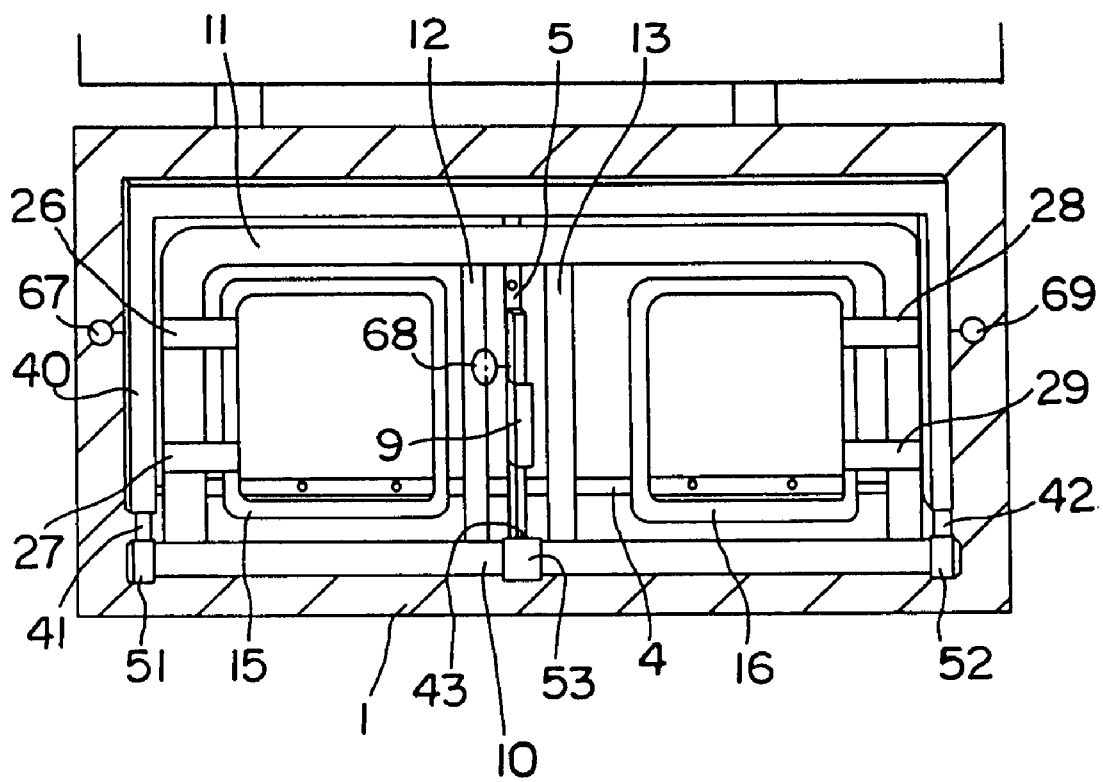
FIG. 5 shows another view of the embodiment of FIG. 1.

At FIG. 2 the embodiment of FIG. 1 is seen in detail. Side frames 15 and 16 are opened. Each of them is mounted on frame 11 and pivots along hinges attached to frame 11. For example, side frame 15 is carried on frame 11 by way of hinges 26 and 27. Referring briefly to FIG. 5, frames 15 and 16 are shown pivoted into frame 11 by way of hinges 26–27, and 28–29, respectively.

Turning back to FIG. 2, side frame 15 is shown pivoted outwardly, along hinges 26 and 27 and perpendicularly to the frame 11. The side frame 15 is, in this embodiment, constructed of 1-inch diameter steel tubing and the hinges 26 and 27 are metal strap hinges, wrapped around frame 11. Any materials known in the art may be used for the tubing and the hinges in other embodiments.

Plate 55 is affixed to side frame 15 and extends downwardly therefrom. Plate 55 will act as a stop to the pivoting of side frame 15 by contacting the side of bracket 40, in order to prevent the side frame 15 from moving further. A similar construction is seen with regard to side frame 16, however, the stop plate complement to stop plate 55 is not shown here. Pins not seen in this view are inserted through the bracket 40, into corresponding holes in the stop plates 55, and so prevent further movement of the frame. Hinges 28 and a second hinge (not shown) carry the side plate 16 upon frame 11. The use of plates may be, as well, fixed or movable in other embodiments, so that, for example, the side frames may be moved at various angles off the perpendicular. In other embodiments, other mechanisms known in the art may be used to prevent further movement of the frames.

Turning briefly to FIG. 5, a folded configuration of the side frames is seen. In this view, both side frames have been folded along their hinges, and nest within frame 11. Frame 11 is, in turn, folded along the hinges 51, 52 and 53 so that the entire assembly rests against the tailgate 1. (This folded configuration is also shown in profile in FIG. 1.) Frame 11 also has, in this embodiment, support tubes 12 and 13 welded to it along its upper tube as well as base member 10 of frame 11. Frame 11 as well as these support tubes 12 and 13 are formed of a length of 1-inch diameter steel tube. The hinges 51, 52 and 53 are metal strap hinges, wrapped around base member 10, and welded to the ends of extension members 41, 42 and 43, as is described in further detail below. Any materials known in the art may be used for the tubing and the hinges in other embodiments.

This embodiment has the ability to utilize plastic or other covers on the frames. These covers, also known as "skins" which may "dress up" the external appearance of the embodiment, as can be seen in FIG. 2. In this embodiment the skins 60, 70, and 80 are shown with a slotted appearance and are molded ABS (Acrylonitrile Butadiene Styrene) plastic. It is also possible to use PVC (polyvinyl chloride) or other similar plastic. In some embodiments, in may be desired to provide the skins with raised or recessed ribs or other details. These could be molded into a plastic skin, or fastened thereto by methods known in the art, and would provide structural or ornamental enhancement.

The skins are fastened by screws, however, any method of fastening such as plastic fasteners, snap fit, or other means known in the art may be used. Additionally, in other embodiments, the appearance of these skins may be modified as desired. In other embodiments, other external devices may also be used, such as lights or the like, temporarily or permanently attached to the device.

In other embodiments, other external materials known in the art, or none, may be used. For example, aluminum, netting or other materials known in the art may be used. These may also be used to enclose or restrain the top of the embodiments. It may also be desirable, in certain embodiments to form a full enclosure about the frames, using materials known in the art. Other embodiments may also have the side panels extent while eliminating the back frame.

The frames, skins and other components may be molded or made, through methods and materials known in the art, of single piece construction. For example, the frame used at the rear, the skin for the frame and the pivot means used for the frame may all be molded into a single piece of structural foam, ABS plastic, or other materials known in the art. Other components may be similarly constructed through one piece construction.

Figure 3:
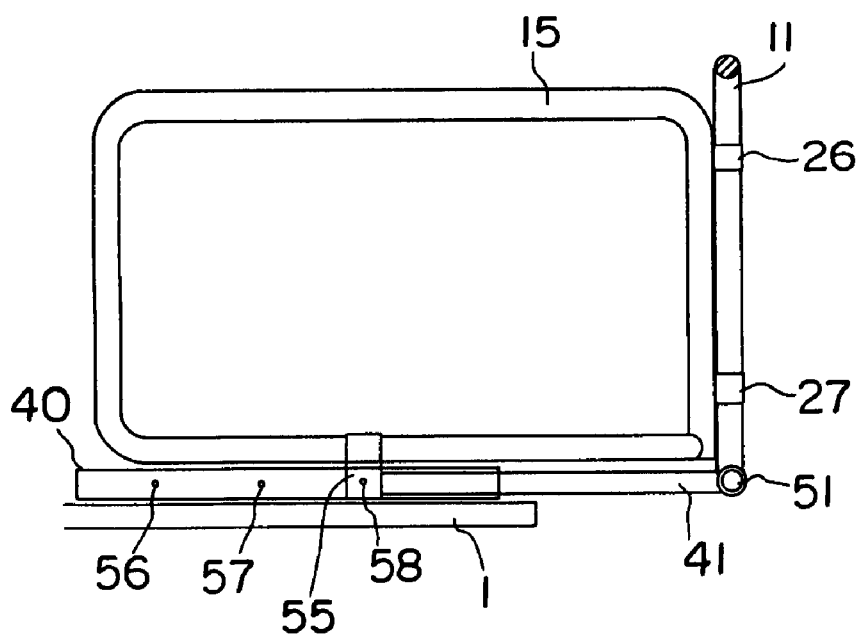
FIG. 3 shows a sectional view along line III—III in the embodiment of FIG. 2.

FIG. 3 is a view taken along lines III—III. The extension member 41 is shown extended outwardly. Of course, the members 42 and 43 are also extended, but are not shown here. Holes 56, 57 and 58 are in bracket 40, and, in correspondence with the hole in stop plate 55, are used in conjunction with a pin arrangement, to allow for the extension of the embodiment at various predetermined intervals. A similar arrangement exists with regard to side frame 16.

The use of extension members permits even further extension of the present embodiment from the rear of the truck. In this embodiment, due to the structural constraints of the materials used, the furthermost extension is about eight inches. Of course, in other embodiments, different configurations or materials may permit lesser or greater outward extension. In another preferred embodiment, for example, the device extends enough, about 2", to permit the frame and nested panels to pivot downwardly over the lip of the tailgate upon which is mounted.

Additionally, in other embodiments, a floor may be utilized with the device and/or its extension, and thus provide further retention characteristics. For example, the embodiment seen in FIG. 2, which allows for an extension, and which uses the tailgate as essentially an extension of the floor, has no floor for the extended part. Yet, it is possible to use a collapsing or other type floor for the extension, so that the floor will be used at will.

Figure 4:
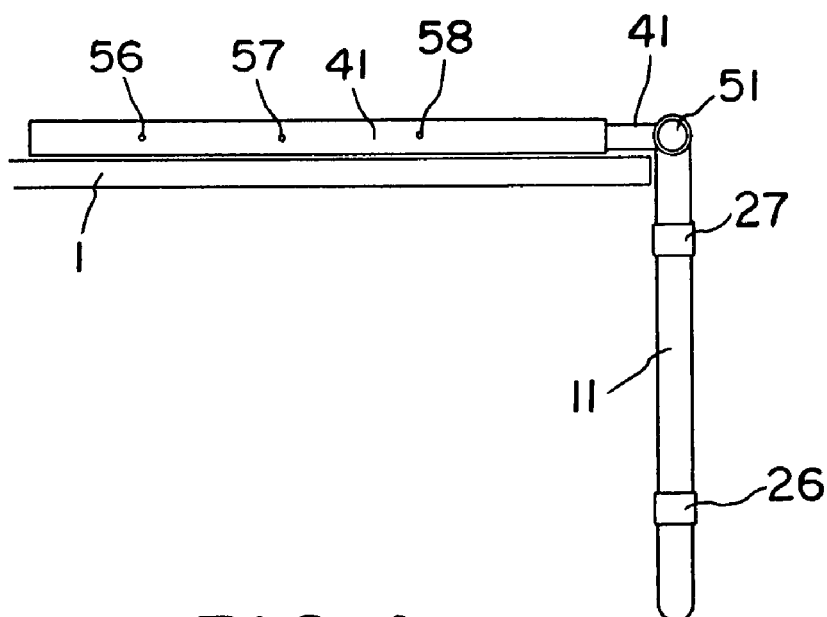
FIG. 4 shows another view of the embodiment of FIG. 1.

FIG. 4 is a view of the embodiment taken from outside the device. This figure shows the extension member 41 retracted. The other extension members are not shown here but they are retracted as well. Additionally the side frame 15 has been folded, that is pivoted, about its hinges 26 and 27 to nest within frame 11. Frame 11 has been pivoted downwardly, about the hinge 51, and the other hinges 52 and 53 (not shown here) past the horizontal plane of the tailgate 1.

At FIG. 5, the entire embodiment is shown folded against the tailgate 1. Here side frame 15 and side frame 16 can be seen. These frames are folded within frame 11, along hinges 26–29. Additionally, hinges 51, 52 and 53 operate to fold frame 11 flat against the tailgate, and extension members 41, 42 and 43 are retracted, so the entire embodiment fits within bracket 40. Pins 67 and 69 extend through the bracket 40 in a manner not shown here and retain frame 11 by entering into holes set therein.

Figure 6:
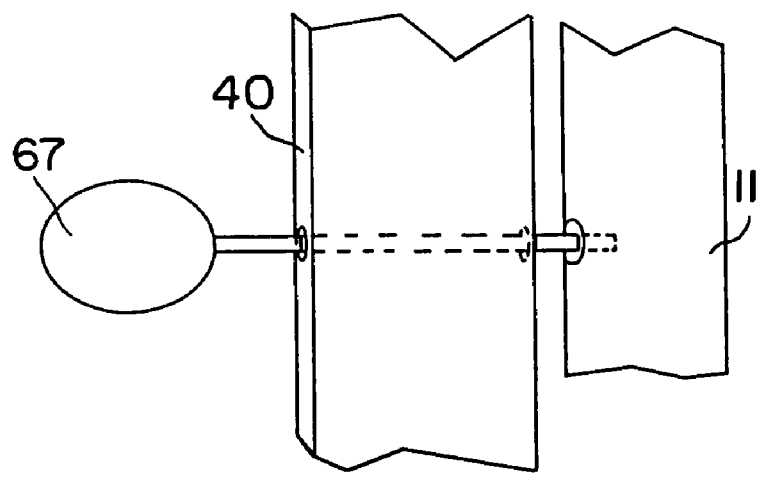
FIG. 6 shows another view of the embodiment of FIG. 1.

The use of pin 67 in this manner is shown in FIG. 6. Both side panels 15 and 16 are held in this closed position in this embodiment by the weight of their construction and the friction of hinges 26–29, as well as, if used, the plastic skin 70. In other embodiments, other means known in the art may be used to retain the side panels.

Also seen at FIG. 5 are the straps 4 and 5 which serve to retain the embodiment to the tailgate, through use of screws inserted through the straps into holes in the straps and the tailgates. These straps also provide structural support to the embodiment as is described in further detail below. Bracket 9 and bracket 40 are both of box steel construction and serve to retain the steel tubes of extension members 41, 42 and 43.

Figure 7:
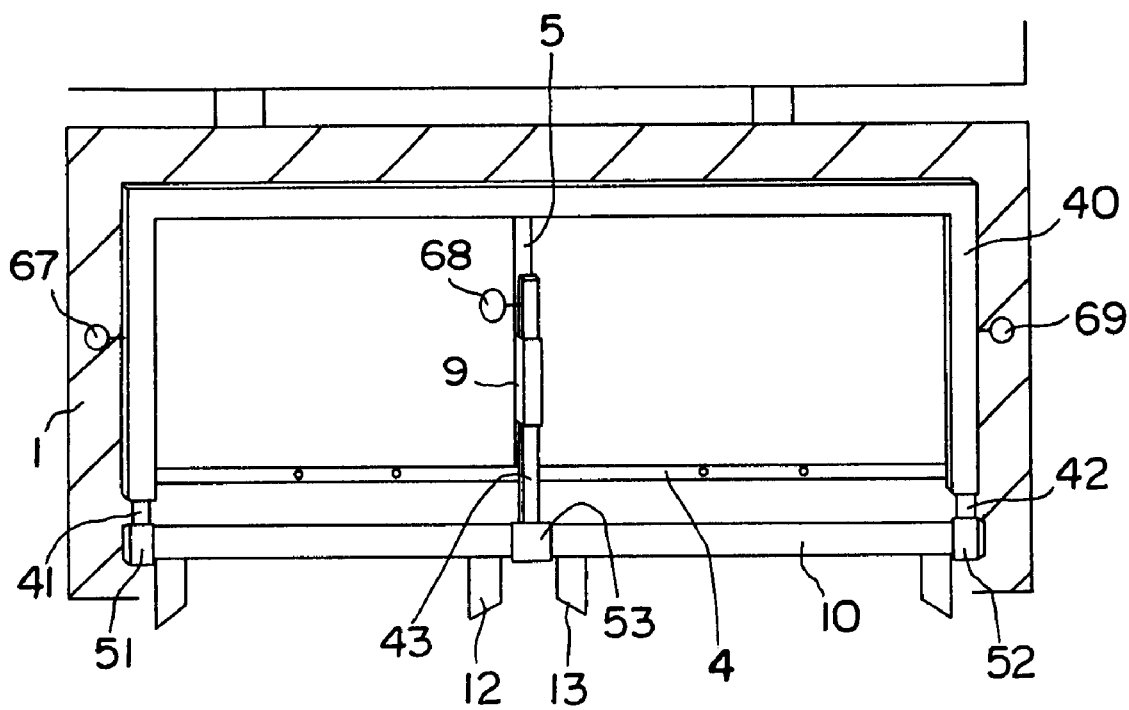
FIG. 7 shows another view of the embodiment of FIG. 1.

Turning to FIG. 7, the embodiment is shown unfolded along hinges 51, 52 and 53. Straps 4 and 5 are constructed of steel in this embodiment. They are welded to each other as well as to bracket 40. Bracket 9 is also welded to strap 5. Holes in the straps 4 and 5 are shown. These provide means for attaching bracket 40 to the tailgate by use of screws as is known in the art. In other embodiments, other means to attach the device to the tailgate may be used including straps and the like. For example, a clamp construction may be used instead of screws so that modification of the tailgate is not required as is the case with the screws above. Such a clamp or clamps may be mounted upon existing structures on the tailgate, or be screwed onto the tailgate, while retaining the bracket through a folded clamp or other configuration. Additionally, in yet other embodiments, attachment may be directly within the tailgate, whether by initial construction or post manufacture modification. For example, a slot may be cut within the tailgate so that an embodiment of the present invention may be inserted within the tailgate.

Figure 8:
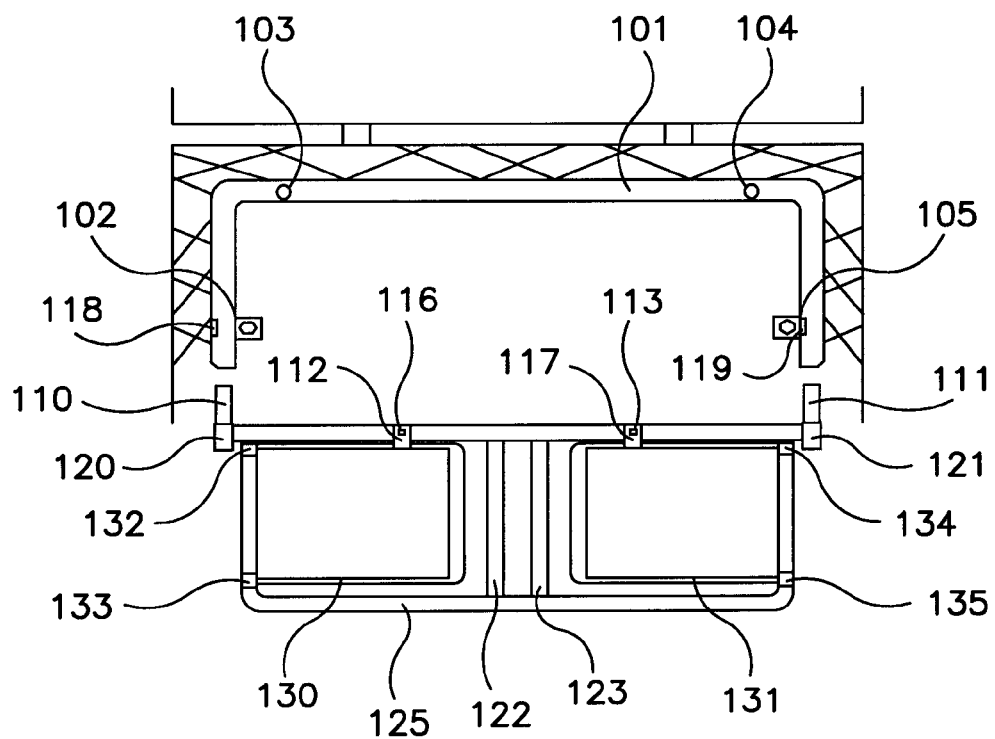
FIG. 8 shows a preferred embodiment of the present invention.

FIG. 8 shows yet another embodiment, mounted on the tailgate and partially unfolded in a top view. Bracket 101 has mounting points 102, 103, 104 and 105. Extension members 110 and 111 fit within bracket 101. The extension members of this embodiment extend enough to provide the ability for this embodiment, when mounted on the tailgate, to slide over the end of the tailgate when the frame is extended outwardly. Of course, the length of the extension members in other embodiments depends upon the desired extension. For example, an embodiment installed in the tailgate or near the top of the tailgate may need only a short, two inches or less, extension member.

As explained below, the actual amount the frame 125 is extended is, in this embodiment, dependent upon the travel of bolts 126 and 127 (shown below in FIG. 9) within slots 118 and 119. The extension of this embodiment provides the ability to rotate frame 125 entirely downwardly, thereby permitting easier loading, i.e., objects do not have to be lifted over frame 125 when it is unfolded entirely.

Pivot means 120 and 121 pivot frame 125 about the end of extension members 110 and 111. Frame 125 is braced by support tubes 122 and 123. Side frames 130 and 131 pivot about the frame 125 by way of pivot means 132, 133, 134 and 135. Of course, in other embodiments, the pivot means may be of any type or number known in the art, such as single pivots, hinges, etc. Side plates 116 and 117 are fixed to side frames 130 and 131, and are used to fix the side frames in place as set forth below.

This entire embodiment is constructed of steel tubing. Of course, other materials known in the art can be used as well, such as aluminum, plastic etc. Additionally, the frames of this embodiment and other embodiments, as well as the other components, of this and other embodiments, can be covered in plastic or other materials for aesthetic or other reasons. The frames, skins and other components may be molded or made, through methods and materials known in the art, of single piece construction. For example, the frame used at the rear, the skin for the frame and the pivot means used for the frame may all be molded into a single piece of structural foam, ABS plastic, or other materials known in the art. Other components may be similarly constructed through one piece construction.

Figure 9:
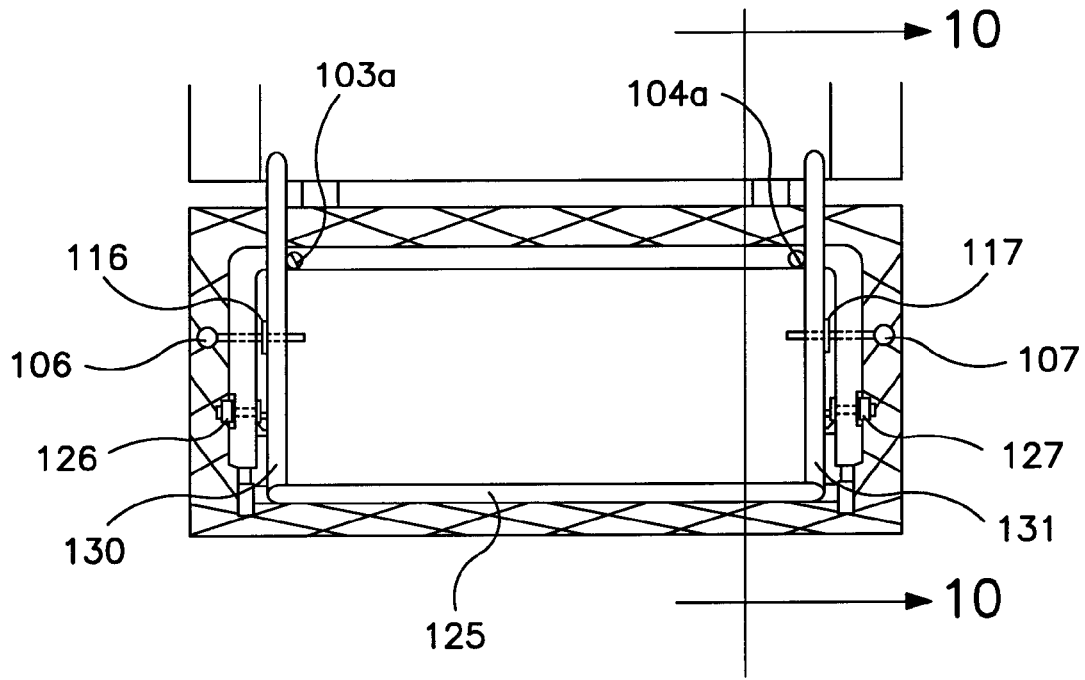
FIG. 9 shows another view of the embodiment of FIG. 8.

FIG. 9 shows the embodiment of FIG. 8 unfolded on the truck tailgate in a top view. The side frames are held in place by pins 106 and 107, inserted through side plates 116 and 117, as well as by screws 103a and 104a inserted through mounting points 103 and 104, as is described below. Of course, in other embodiments, other means known in the art may be used to retain the side frames. Pins 106 and 107 are also used to retain the frame 125 when it is folded flat against the tailgate. Of course, in other embodiments, other means known in the art may be used to retain the frame against the tailgate.

Figure 10:
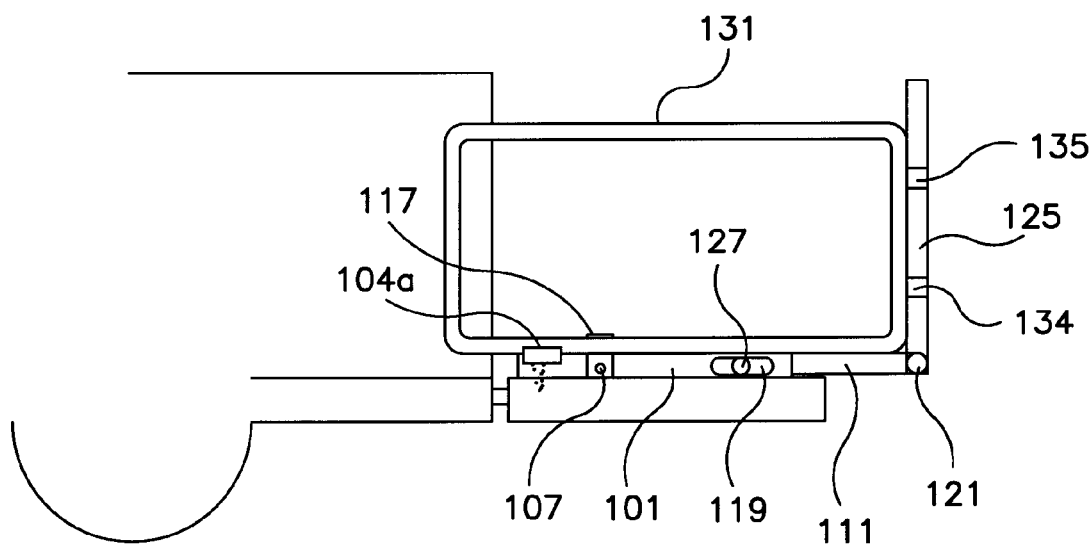
FIG. 10 shows a sectional view along line X—X in the embodiment of FIG. 9.
Figure 11:
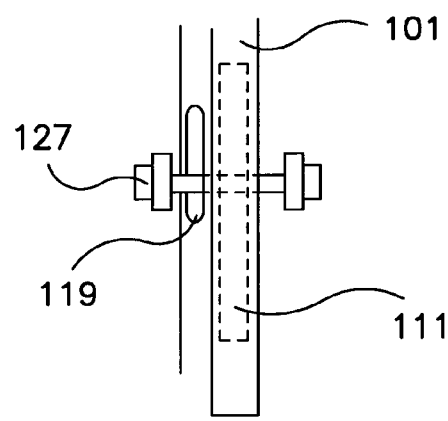
FIG. 11 shows another view of the embodiment of FIG. 8.

FIG. 10 is a view taken along line X—X of FIG. 9. Screw 104a is used through mounting point 104 (not shown here) to mount bracket 101 to the truck. Screw 104a has a head that protrudes from bracket 101 so that the bottom of side frame 131 is retained. Side frame 131 is also retained by pin 107, the end of which is shown in this Figure, which passes through side plate 117 and bracket 101. Slot 118 has bolt 127 riding therein. Bolt 127 retains extension member 111, as is seen in further detail in FIG. 11.

Figure 12:
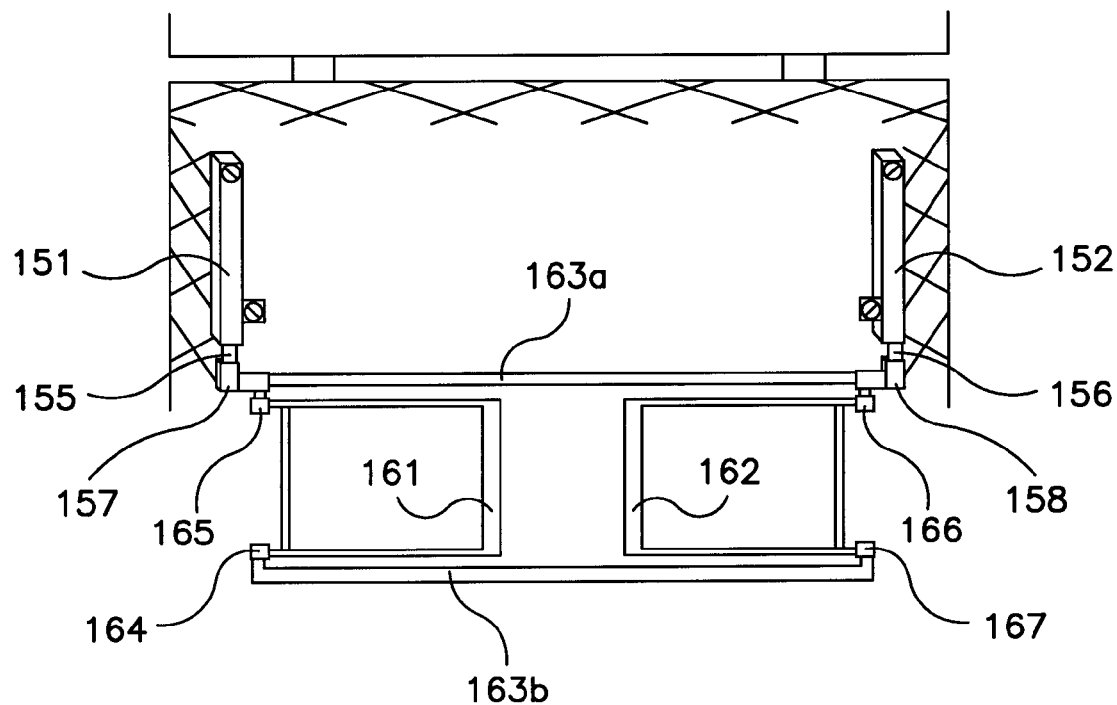
FIG. 12 shows a preferred embodiment of the present invention.

FIG. 12 shows a view of another preferred embodiment. Brackets 151 and 152 retain extension members 155 and 156. Pivot means 157 and 158 pivots frame 163, comprised of base 163a and top 163b. Pivot means 164, 165, 166, and 167 pivot side frames 161 and 162 outwardly.

Figure 13:
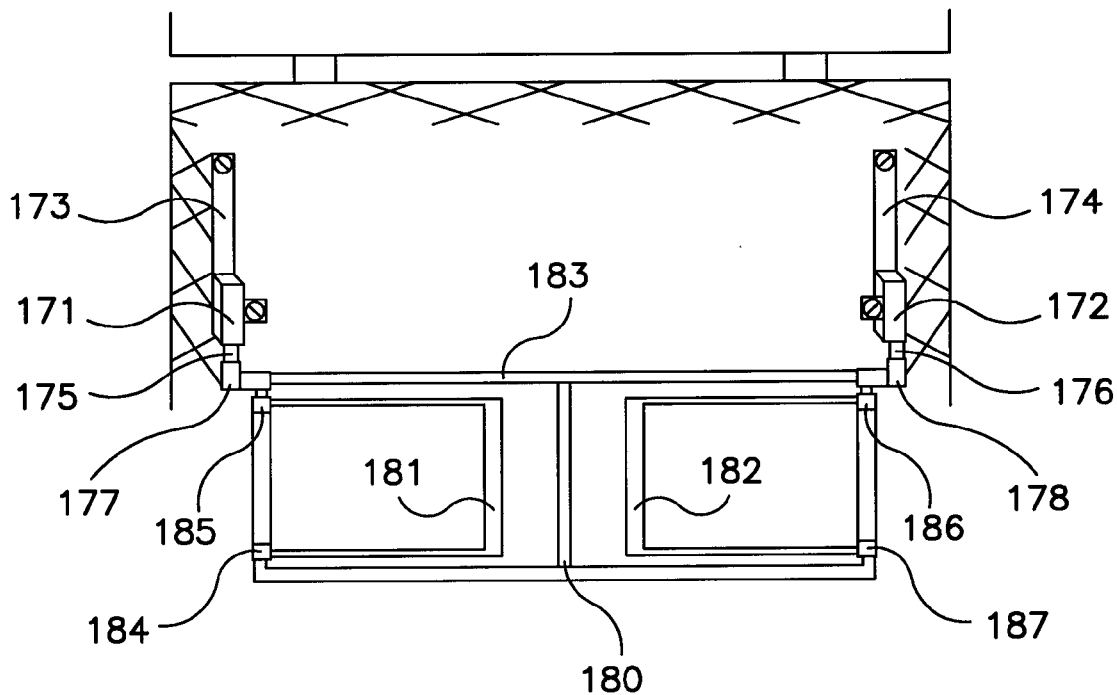
FIG. 13 shows a preferred embodiment of the present invention.

FIG. 13 shows a view of another preferred embodiment. Brackets 171 and 172 retain extension members 175 and 176. Also seen are straps 173 and 174 providing additional support of the embodiment on the tailgate. Pivot means 177 and 178 pivot frame 183. Pivot means 184, 185, 186, and 187 pivot side frames 181 and 182 outwardly. Center tube 180 provides additional structural support to frame 183.

Figure 14:
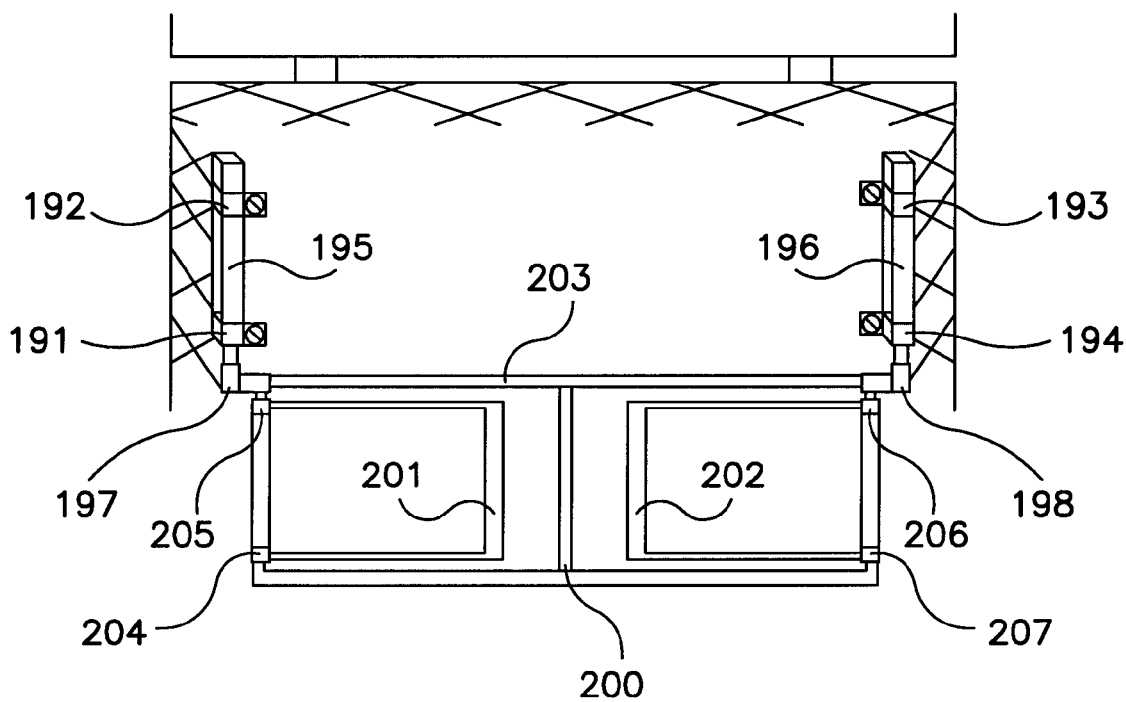
FIG. 14 shows a preferred embodiment of the present invention.

FIG. 14 shows a view of another preferred embodiment. Brackets 191, 192, 193 and 194 retain extension members 195 and 196. These brackets are relatively small in relation to the extension members, and two are used to retain each member. Of course, in this and other embodiments the brackets may take on various shapes, and may (or may not) be integrated with the mounting means. Pivot means 197 and 198 pivot frame 203. Pivot means 204, 205, 206, and 207 pivot side frames 201 and 202 outwardly. Center tube 200 provides additional structural support to frame 203.

Figure 15:
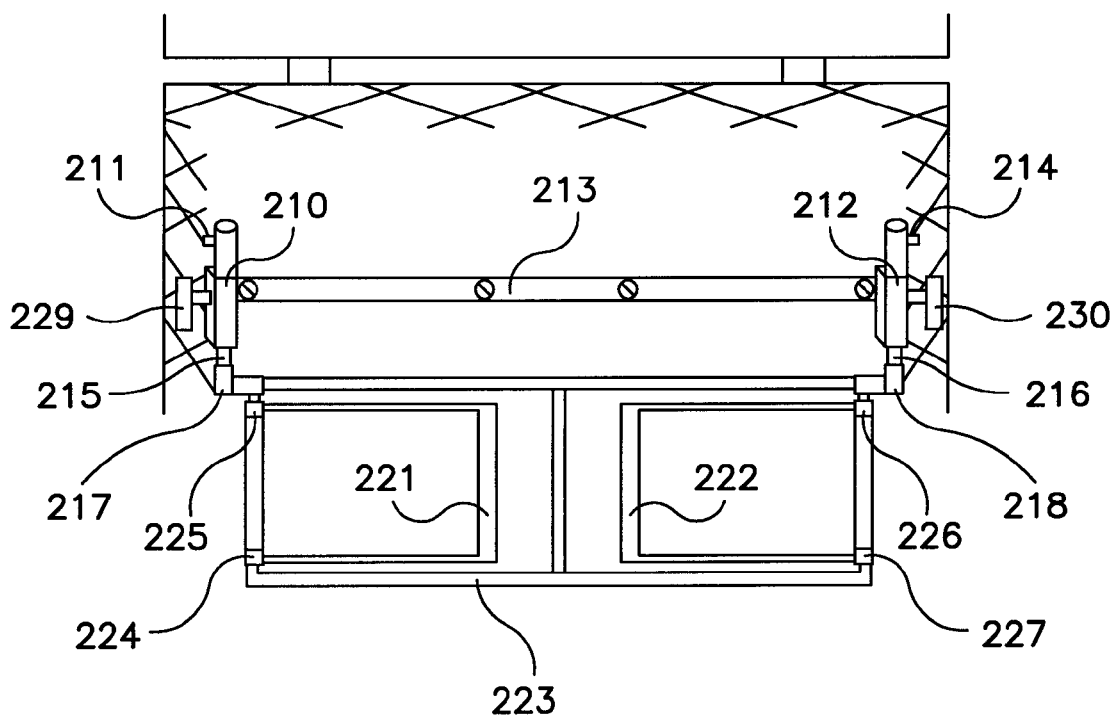
FIG. 15 shows a preferred embodiment of the present invention.

FIG. 15 shows a view of another preferred embodiment. Brackets 210 and 212 retain extension members 215 and 216. Also seen is strap 213 providing additional support of the embodiment on the tailgate. Pivot means 217 and 218 pivots frame 223. Pivot means 224, 225, 226, and 227 pivot side frames 221 and 222 outwardly. Knobs 229 and 230 tighten the extension members 215 and 216 in place, through pass through bolts in brackets 210 and 212. Stop pins 211 and 214 prevent the extension members from falling out of their respective brackets.

Figure 16:
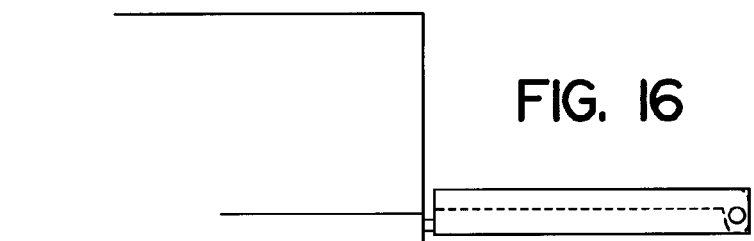
FIG. 16 shows a preferred embodiment of the present invention.
Figure 17:
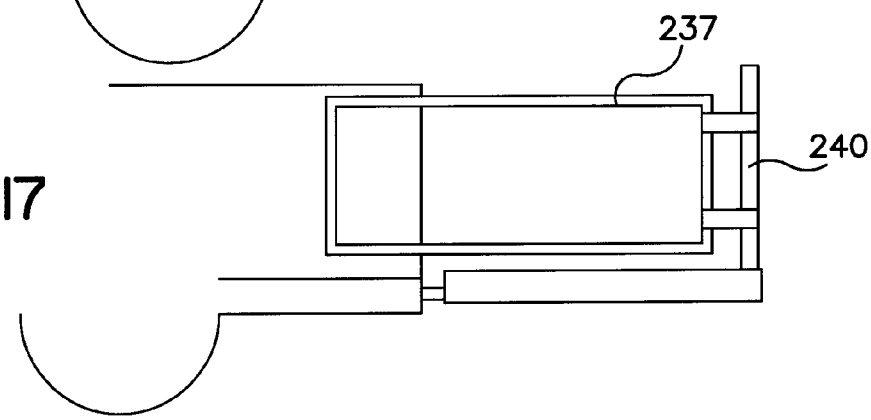
FIG. 17 shows another view of the embodiment of FIG. 16.
Figure 18:
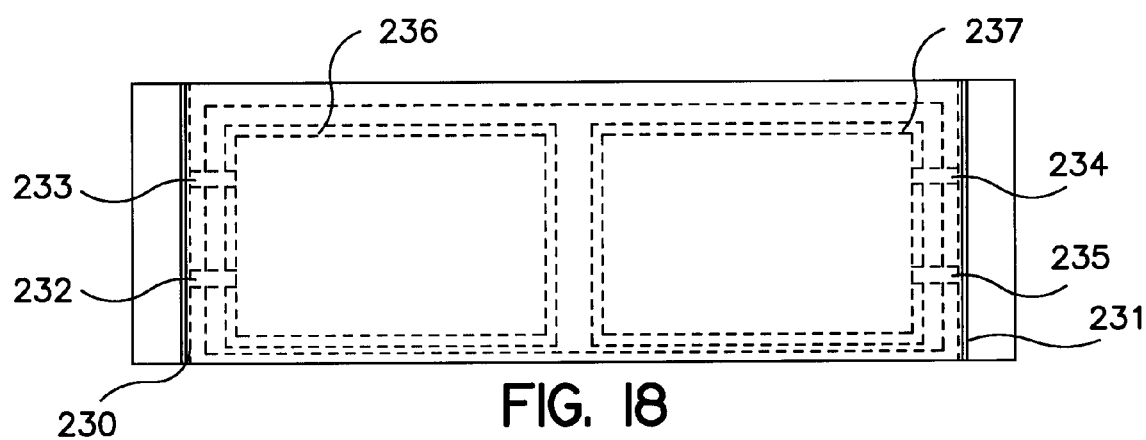
FIG. 18 shows another view of the embodiment of FIG. 16.

FIGS. 16–20 show an embodiment that is recessed on a tailgate. FIG. 16 shows the lowered tailgate with the recessed embodiment in phantom. FIG. 17 shows the unfolded embodiments as seen from the inside of the tailgate looking toward the outside. FIG. 18 shows a view of the frames as recessed within the tailgate.

Figure 19:
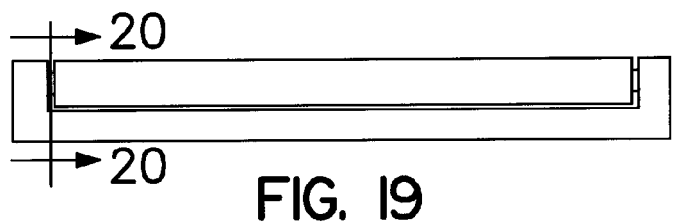
FIG. 19 shows another view of the embodiment of FIG. 16.
Figure 20:
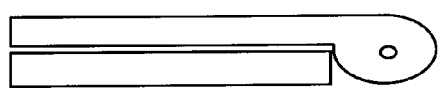
FIG. 20 shows a sectional view along line XX—XX in the embodiment of FIG. 16.

FIG. 19 shows an end view of this embodiment. FIG. 20 shows a view taken along the line XX—XX. Turning back to FIG. 18 pivot points 230 and 231 can be seen which pivot the embodiment upwardly. Also seen are pivots 232, 233, 234 and 235 which pivot side frames 236 and 237 outwardly. FIG. 17 shows side frame 237 pivoted outwardly from frame 240. Not seen in this embodiment, but present in other similar embodiments is a retention mechanism for keeping the side frames close to or attached to the truck sides when unfolded. Examples of such retention mechanisms as known in the art are pins, screws, magnets and the like.

This entire embodiment is constructed of steel tubing. Of course, other materials known in the art can be used as well, such as aluminum, plastic etc. Frame 240 is, in this embodiment, covered with a plastic skin. Additionally, the other frames of this embodiment and other embodiments, as well as the other components, of this and other embodiments, can be covered in plastic or other materials for aesthetic or other reasons. The frames, skins and other components may be molded or made, through methods and materials known in the art, of single piece construction. For example, the frame used at the rear, the skin for the frame and the pivot means used for the frame may all be molded into a single piece of structural foam, ABS plastic, or other materials known in the art. Other components may be similarly constructed through one piece construction.

Figure 21:
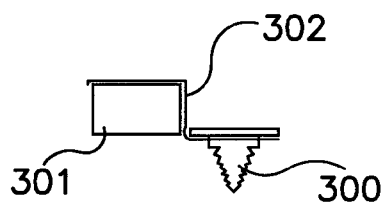
FIG. 21 shows a preferred embodiment of the present invention.

FIG. 21 shows an alternate mounting arrangement. Here screw 300 is used to secure bracket 301 by way of clamp 302. This mounting arrangement may be especially useful when a tailgate has indentations.

Figure 22:
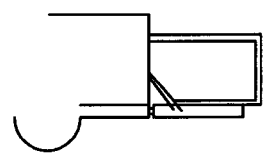
FIG. 22 shows a preferred embodiment of the present invention.
Figure 23:
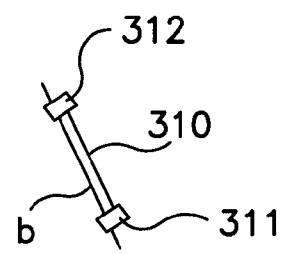
FIG. 23 shows another view of the embodiment of FIG. 22.

FIGS. 22 and 23 show an embodiment which provides for additional support for an tailgate with an embodiment mounted thereon. Rubber strap 310 is attached to tailgate support b with clamps 311 and 312. Tailgate supports such as b, comprising a cable or metal beam are commonly used to retain the tailgate when opened. Rubber strap 310 lessens the weight of the tailgate for the user as the tailgate is opened and closed. Of course, the straps can be made of any material sufficiently elastic known in the art, in order to assist in the opening and closing of the tailgate of a vehicle, when embodiments of the present invention are installed upon the vehicle, and the clamps can also be made of any materials known in the art.

Figure 24:
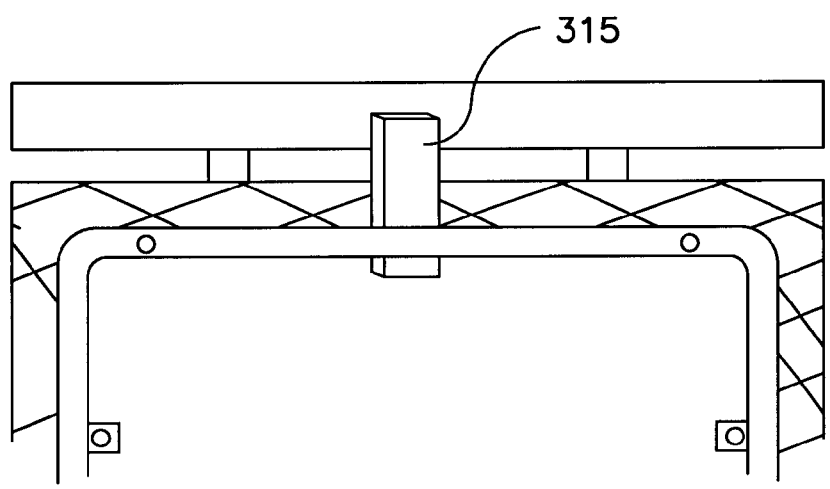
FIG. 24 shows a preferred embodiment of the present invention.
Figure 25:
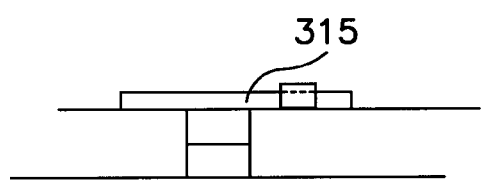
FIG. 25 shows another view of the embodiment of FIG. 24.
Figure 26:
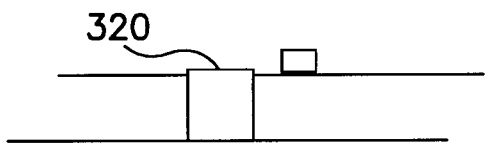
FIG. 26 shows a preferred embodiment of the present invention.

FIGS. 24 and 25 show an embodiment which uses a sliding block 315 to also support the tailgate. This block helps prevent the tailgate from bouncing, and as seen at FIG. 25 passes through the bracket of this embodiment and may be slid back and forth through that bracket. FIG. 26 shows a rubber block 320 placed in the gap between the tailgate and truck bed which has the same effect as the block of FIG. 25 and 26, that is, to prevent bouncing of the tailgate of a vehicle, when embodiments of the present invention are installed upon the vehicle. Of course, the block can be made of any material known in the art.

A pickup tailgate is not the only vehicle with which embodiments of the present vehicle may be utilized. Other vehicles with storage areas, including sport utility vehicles, vans, station wagons and the like may utilize embodiments of the present invention to extend storage areas, whether by incorporation in the original vehicle or after market additions.

Other embodiments of the invention also may have a mounting apparatus on the rear of the vehicle, rather than on the tailgate. For example, a bracket may be mounted between the rear side walls of the bed of a pickup truck, and so retain the device upon the vehicle. Of course, other embodiments may have other means of fastening the device to the vehicle bed. For example, use of one or more straps, extending from one or more side frames to anchor points on the truck side walls, may be possible.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An apparatus for the storage bed of a vehicle comprising:
   a first elongated extension member mounted in pivotal relationship, via a first pivot means, with a frame;
   a second elongated extension member mounted in pivotal relationship, via a second pivot means, with said frame;
   a first and second side frame, with each of said first and second side frames having a side frame pivot means mounted upon said frame;
   whereby said side frames pivot outwardly along said side frame pivot means when the apparatus is mounted on the vehicle.

2. An apparatus as in claim 1, whereby said side frames are adapted to be in nesting relationship with said frame.

3. An apparatus as in claim 1, further comprising a first and second cover mounted upon each of said first and second side frames respectively, and a third cover mounted upon said frame.

4. An apparatus as in claim 3, whereby said first, second and third cover are removeably mounted upon said first and second side frames and said frame respectively.

5. An apparatus as in claim 1, whereby said first and second extension members are mounted upon a first and second bracket respectively, so as to permit at least some movement of said first and second extension members relative to said brackets.

6. An apparatus as in claim 5, whereby said side frames are adapted to be in nesting relationship with said frame, and said frame in turn is adapted to be in nesting relationship to said bracket.

7. An apparatus as in claim 5, whereby said brackets are mounted to a vehicle.

8. An apparatus as in claim 7, whereby said first and second extension members are slideably mounted within said brackets.

9. An apparatus as in claim 8, further comprising a first and second cover mounted upon each of said first and second side frames respectively, and a third cover mounted upon said frame.

10. An apparatus as in claim. 9, whereby said first, second and third cover are removeably mounted upon said first and second side frames and said frame respectively.

11. An apparatus as in claim 1, further comprising an elongated elastic means, with a first end affixed to the storage bed of a vehicle and a second end affixed to the tailgate of a vehicle, whereby said elastic means is used to assist in the opening and closing of said tailgate of a vehicle, when said extension apparatus is installed upon said vehicle.

12. An apparatus as in claim 1, further comprising a block means, with a first end in contact with the storage bed of a vehicle and a second end in contact with the tailgate of a vehicle, whereby said block means is used to prevent bouncing of the tailgate of a vehicle, when said extension apparatus is installed upon said vehicle.

* * * * *